United States Patent

Sundström

[11] Patent Number: 5,974,673
[45] Date of Patent: Nov. 2, 1999

[54] NOSE SPROCKET FOR CHAIN SAW GUIDE BARS

[75] Inventor: Erik Sundström, Sandviken, Sweden

[73] Assignee: Sandvik AB, Sandviken, Sweden

[21] Appl. No.: 08/973,974

[22] PCT Filed: Jan. 16, 1997

[86] PCT No.: PCT/SE96/00838

§ 371 Date: Jul. 6, 1998

§ 102(e) Date: Jul. 6, 1998

[87] PCT Pub. No.: WO97/01422

PCT Pub. Date: Jun. 25, 1996

[30] Foreign Application Priority Data

Jun. 26, 1995 [SE] Sweden ................................ 9502291

[51] Int. Cl.$^6$ ................................................ B23D 57/02
[52] U.S. Cl. .............................. 30/381; 30/384; 474/156; 474/157
[58] Field of Search .............. 30/381–387; 474/153–157

[56] References Cited

U.S. PATENT DOCUMENTS 3,124,177  3/1964  Ekrud .
3,263,715  8/1966  Dobbertin .
3,279,508  10/1966  Ehlen et al. .
3,498,346  3/1970  Gasner et al. .
3,589,415  6/1971  Locati .
4,387,615  6/1983  Lemery .
4,492,030  1/1985  Beerens ..................................... 30/384
4,754,549  7/1988  Fischer et al. .
4,970,789  11/1990  Bell ........................................... 30/384

FOREIGN PATENT DOCUMENTS 259180  1/1949  Switzerland ............................. 30/384

Primary Examiner—M. Rachuba
Attorney, Agent, or Firm—Burns, Doane, Swecker & Mathis, L.L.P.

[57] ABSTRACT

An improved nose sprocket which carries central drive links of a saw chain has a gullet shaped to provide ample space for saw dust to collect and reduce stress concentration within the gullet. The nose sprocket has teeth which define a gullet. The gullet has a bottom portion shaped with a varying radius of curvature. The varying radius of curvature is largest at a deepest portion of the gullet and smallest where the bottom portion meets flank portions of the teeth which carry the central drive links.

5 Claims, 1 Drawing Sheet

NOSE SPROCKET FOR CHAIN SAW GUIDE BARS

BACKGROUND

To carry a saw chain around the nose of a chain saw guide bar, a thin sprocket with teeth has been used for a long time. These carry the saw chain without friction against the edge of the guide bar nose. This causes less wear and needs less power. It also makes it possible in certain situations to cut with the upper, outward moving part of the chain.

To make a thin sprocket work with teeth so that it functions properly, it is necessary that the saw chain is carried at a well defined radius from the center of the sprocket bearing. This is accomplished if the ends of the chain drive link at its end portions are carried by the flanks of the sprocket teeth. When sawing timber with large chain velocity and coarse sawdust, it is important that there is space for sawdust between the underside of the drive links and the bottom of the gullet between the sprocket teeth, and that the drive link does not hit the sprocket in such a way that the pointed bottom part of the drive link is deformed, since its shape is vital for the distribution of lubricating oil along the path of the saw chain along the edge of the saw guide bar.

The gullet bottom has been shaped in different ways. In the patent U.S. Pat. No. 3,124,177 the gullet is V-shaped with straight flanks, with the disadvantage of concentrated stresses at the gullet bottom due to wedging action when the drive link is pushed into the gullet. In the patent U.S. Pat. No. 3,279,508 the gullet bottom is shaped as a circular arc, tangent to straight portions of the flanks, but this does not leave ample space for sawdust under the drive link. In the patents U.S. Pat. Nos. 3,263,715, 3,498,346 and 3,589,415 the gullet bottom was made as a circular arc, undercutting the straight flank portions so that the teeth were somewhat undercut. The latter shape leaves enough room for sawdust and has been much used.

Chain saws for mineral or coal use low chain velocity and small sawdust, and have less need for free space under the drive links.

There is a demand for nose sprockets with smaller diameters and fewer teeth, but it has until now been difficult to combine sufficient space for sawdust with sufficient material thickness between the gullet bottom and the sprocket bearing, as spacious, undercut gullets have a larger depth. The same problem has long been known from drive sprockets of chain saws, and was to resolved by letting the sawdust leave the gullets in an axial direction but this is not possible in a nose sprocket.

BRIEF SUMMARY OF THE DISCLOSURE

The present invention is a nose sprocket having an improved gullet shape. The nose sprocket of the present invention includes a gullet having a bottom portion with a varying radius of curvature. The varying radius of curvature is largest at a deepest part of the bottom portion of the gullet and smallest where the bottom portion meets teeth which carry the central drive links of a saw chain. For a certain material thickness determined by the need to avoid fatigue cracking in the gullet bottom, it is thus possible to either reduce the sprocket diameter to get a lighter and safer guide bar, or increase the bearing diameter to get better lifetime of the bearing and less risk of buckling of the nose sprocket due to thermal stresses.

DETAILED DESCRIPTION OF THE PREFERRED EMBODIMENT

Figure 1:
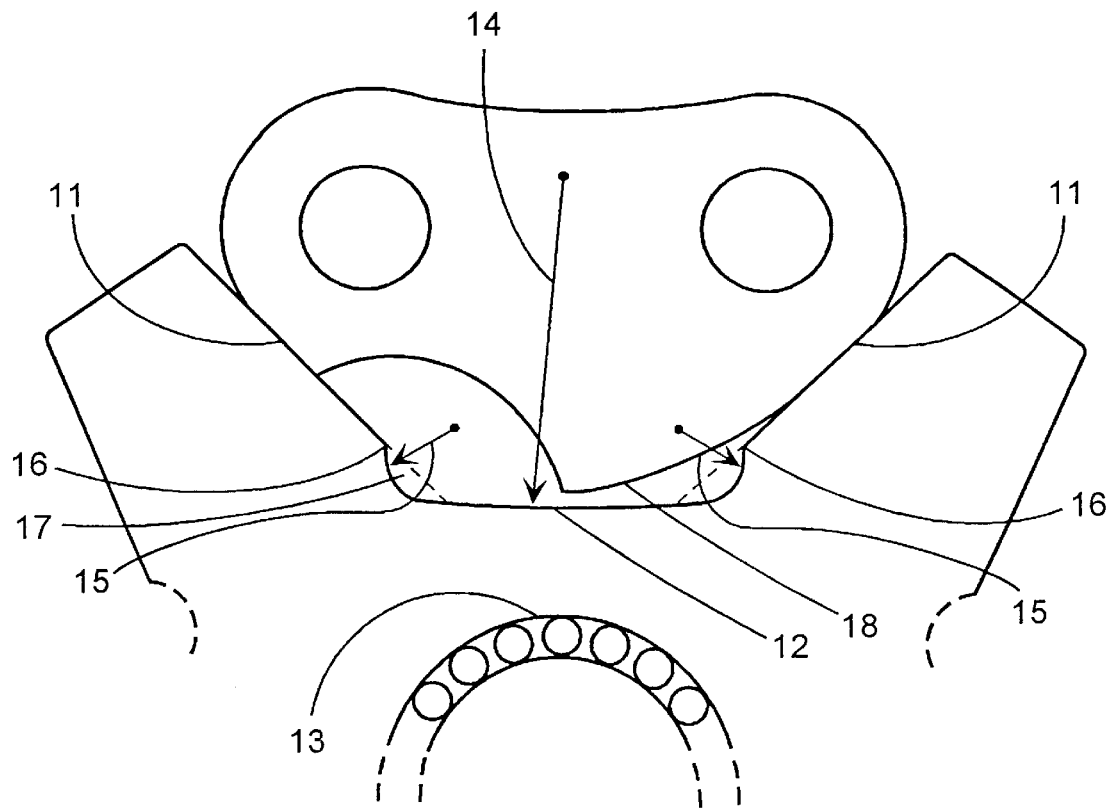
FIG. 1 is a side view of an embodiment of a nose sprocket according to the present invention.

The bending moment which acts on the nose sprocket when a drive link is pressed into the gullet is largely determined by the angle between the tooth flanks (11) which in turn depends on the drive link shape. A large cross section with reduced risk of deformation or fatigue cracks is achieved, i.e. by making a large distance between the deepest part (12) of the gullet bottom and the outer race (13) of the bearing large, and by reducing stress concentration by making large radii at these points (12, 13). A large outer race radius is desirable to achieve a low bearing load over the rolling elements, but will reduce the cross section so much that the benefit of lower stress concentration is lost. An increased gullet radius will, if the gullet bottom is a circular arc and the length of the flank regions (11) are preserved, reduce the cross section so much that the benefit of stress concentration is lost unless the outer bearing radius is reduced.

According to the invention, the circular arc shape is substituted by another curve, where the curvature is largest (14) at the bottom (12) and smallest (15) at the end (16) where the curve meets the straight flanks (11). The curve is preferably a portion of an ellipse or ellipse-like oval curve, and could preferably be made with a slight undercut (17).

Figure 2:
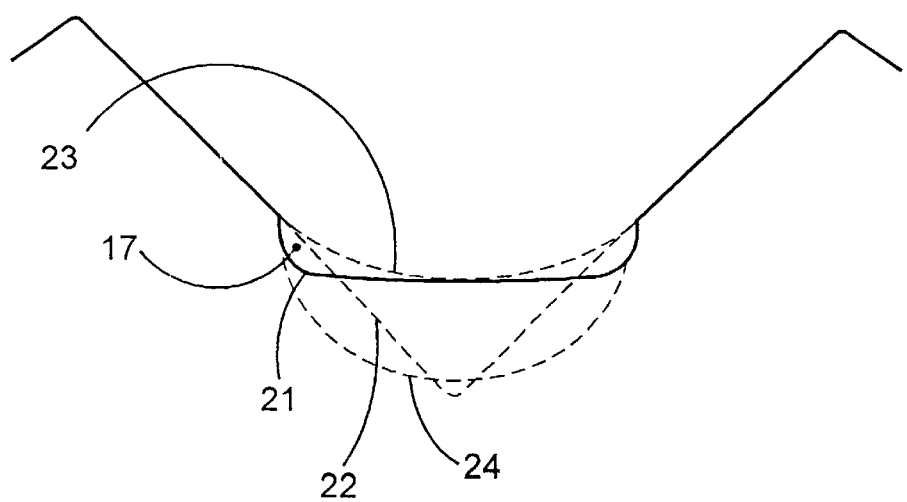
FIG. 2 is a side view of a gullet in the nose sprocket shown in FIG. 1 compared to prior gullet shapes.

In FIG. 2 a gullet bottom shape (21) according to the invention is compared with corresponding curves from previously known nose sprockets, where one curve (22) shows a gullet with very small bottom radius according to U.S. Pat. No. 3,124,177, and a second curve (23) shows a gullet with circular arc bottom without undercut according to U.S. Pat. No. 3,279,508, and a third curve (24) shows a gullet with circular arc bottom with undercut according to U.S. Pat. No. 3,589,415.

FIG. 2 shows that a gullet according to the invention (21) has much less depth than a gullet with small radius (22) or a gullet with circular arc shape and undercut (24), and at least not greater depth than a gullet with circular arc without undercut (23). A gullet according to the invention thus allows at least equal or greater cross section compared to other gullets, and no risk of deforming the drive link lower point (18).

FIG. 2 also shows that the space for sawdust in a gullet according to the invention (21) is considerably larger than in a circular gullet without undercut (23), and that the amount of undercut (17) near the flanks is less than for a circular gullet with undercut (24), thus ensuring that no clear strength loss of the tooth occurs.

Stress concentration at a gullet according to the invention is determined by the radius (14) at the deepest part (12), since the cross section at the undercut (17) and at the transition to the flanks (16) is considerably greater than at the deepest part. As this radius (14) is greater than for any of the other gullets, a gullet according to the invention causes less stress concentration. This means less fatigue risk. If the bearing outer race is constant, or a possibility to enlarge the outer bearing radius with longer bearing life but without increased fatigue risk.

The gullet is, according to the invention, preferably made with a slight undercut (17) which gives more space for sawdust, and which makes it somewhat simpler to punch or mill the tooth shape of the nose sprocket compared to a curved gullet without undercut.

I claim:

1. A nose sprocket for chain saws which carries central drive links of a saw chain having central drive links and side links as the saw chain travels around a nose of a saw guide bar, the nose sprocket comprising:

at least two teeth having flanks for carrying the central drive links; and a gullet defined between the at least two teeth, the gullet having a bottom portion shaped with a varying radius of curvature, the radius of curvature being largest at a deepest part of the bottom portion and smallest where the bottom portion meets portions of the flanks carrying the central drive links.

2. The nose sprocket according to claim 1, wherein the bottom portion of the gullet is shaped as part of an ellipse-like oval curve.

3. The nose sprocket according to claim 1, wherein the bottom portion of the gullet is undercut relative to an imaginary extension line of the flanks.

4. The nose sprocket of claim 1 wherein the entire bottom portion of the gullet is generally concave.

5. The nose sprocket according to claim 2, wherein the bottom portion of the gullet is undercut relative to an imaginary extension line of the flanks.

\* \* \* \* \*